(12) United States Patent
Wise et al.

(10) Patent No.: US 10,761,865 B2
(45) Date of Patent: Sep. 1, 2020

(54) CONFIGURATION FOR GENERATING ONLINE PARTICIPATION AT A WEB PORTAL

(71) Applicant: InvestCloud Inc, West Hollywood, CA (US)

(72) Inventors: John W. Wise, West Hollywood, CA (US); Vicent Sos-Munoz, Beverly Hills, CA (US)

(73) Assignee: InvestCloud Inc, West Hollywood, CA (US)

( * ) Notice: Subject to any disclaimer, the term of this patent is extended or adjusted under 35 U.S.C. 154(b) by 137 days.

(21) Appl. No.: 16/057,514

(22) Filed: Aug. 7, 2018

(65) Prior Publication Data
US 2020/0050468 A1  Feb. 13, 2020

(51) Int. Cl.
| | | |
|---|---|---|
| *G06F 17/30* | (2006.01) | |
| *G06F 9/451* | (2018.01) | |
| *G06F 16/93* | (2019.01) | |
| *G06F 16/958* | (2019.01) | |
| *G06F 16/9535* | (2019.01) | |

(52) U.S. Cl.
CPC .............. *G06F 9/453* (2018.02); *G06F 16/93* (2019.01); *G06F 16/958* (2019.01); *G06F 16/9535* (2019.01)

(58) Field of Classification Search
CPC ...... G06F 9/453; G06F 17/3089; G06F 9/451; G06F 17/30011; G06F 17/30867
See application file for complete search history.

(56) References Cited

U.S. PATENT DOCUMENTS

| 5,973,663 A * | 10/1999 | Bates ................... G06F 3/04855 715/205 |
| 2008/0235175 A1* | 9/2008 | Olive ................... G06F 21/6272 |
| 2014/0254893 A1* | 9/2014 | Phillips .............. G06K 9/00221 382/118 |
| 2015/0213604 A1* | 7/2015 | Li ........................... G06T 13/40 345/473 |

* cited by examiner

*Primary Examiner* — Andrea C Leggett
(74) *Attorney, Agent, or Firm* — Patent Ingenuity, P.C.; Samuel K. Simpson (57) ABSTRACT

A process retrieves, from a database, an online participation model. The online participation model includes a plurality of rules for generating a web portal that aggregates a plurality of documents corresponding to a user. Further, the plurality of rules includes a community criterion for displaying information associated with an additional user distinct from the user at the web portal. Additionally, the plurality of rules includes an appointment criterion that enables a user notification for document completion. The plurality of rules also includes a progression criterion that displays a visual slider corresponding to document completion according to a plurality of time-based demarcations. Moreover, the plurality of rules includes a status criterion that displays a plurality of visual indicia corresponding to a status of the user based on document completion. The process also automatically generates, with a processor, a web portal that complies with the plurality of rules.

14 Claims, 14 Drawing Sheets

Documents

Your Library
- Files
- Photos
- Favorites
- Recent
- Categories
- Sharing
- Trash
- Checklist
- Performance

ADVICE  TOUR  FEATURES  BLOG  UPDATES  HELP CENTER

Jay Steel ˅

See The Future
Use the slider to see recommended documents you should have based on your age Age 37

20 25 30 35 40 45 50 55 60 65 70 75 80 85 90 95 100

231

Here are the documents you should have at Age 37

| Name | Complete By | Countdown |
|---|---|---|
| Social Security Paperwork | Age 25 | ⚠ Missing |
| Tax Report | Age 26 | ⋮ |
| House Mortgage | Age 30 | ⚠ Missing |
| Home Insurance | Age 60 | 23 Years |

Other Documents To Consider

We would like to get to know you better so that we can offer you the best advice. Answer the following questions so we can suggest more documents to consider.

Question 1 of 5
Do you own a house?
Yes >   No >   Skip

CONFIGURATION FOR GENERATING ONLINE PARTICIPATION AT A WEB PORTAL

BACKGROUND

1. Field

This disclosure generally relates to the field of computing systems. More particularly, the disclosure relates to software application code generation.

2. General Background

With recent developments in computing systems, financial technology ("Fintech") platforms have allowed financial institutions/advisors to communicate with end-users via web portals. Rather than having to rely solely on a human financial advisor, end-users may access the web portal to review financial information, personal data, etc.

In order to operate at a high level of efficiency, the web portal has to have an optimal amount of data (financial data, personal data, personal documents, etc.) about the end-user. Yet, typical end-users have been somewhat reluctant about providing such data for inclusion in a web portal.

As a result, a conventional web portal operating on a Fintech platform typically generates recommendations on an incomplete set of data. Accordingly, such conventional web portals may operate in a computationally resource-intensive manner (i.e., exhaustive searches for missing data, erroneous calculations resulting from missing data, etc.). Therefore, conventional Fintech web portals often provide a less-than-ideal user experience in a computationally inefficient manner.

SUMMARY

In one aspect of the disclosure, a computer program product is provided. The computer program product comprises a non-transitory computer useable storage device having a computer readable program. The computer readable program when executed on a computer causes the computer to retrieve, from a database, an online participation model. The online participation model includes a plurality of rules for generating a web portal that aggregates a plurality of documents corresponding to a user. Further, the plurality of rules includes a community criterion for displaying information associated with an additional user distinct from the user at the web portal. Additionally, the plurality of rules includes an appointment criterion that enables a user notification for document completion. The plurality of rules also includes a progression criterion that displays a visual indicator (e.g., a slider) corresponding to document completion according to a plurality of time-based demarcations. Moreover, the plurality of rules includes a status criterion that displays a plurality of visual indicia corresponding to a status of the user based on document completion.

The computer is also caused to automatically generate, with a processor, a web portal that complies with the plurality of rules. In addition, the computer is caused to provide, with the processor, the web portal to a web server that provides access to the web portal to the user.

In another aspect of the disclosure, a system has a database that stores the online participation model. In addition, the system has a processor that performs the functionality of the computer program product.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 2D illustrates an example of a screenshot of the web portal, which is rendered by the computing device illustrated in FIG. 1, that illustrates the Progression criterion.

FIG. 2K illustrates an example of a screenshot of the web portal, which is rendered by the computing device illustrated in FIG. 1, that illustrates the Smart criterion.

DETAILED DESCRIPTION

A configuration for generating online participation on a web portal is provided. The configuration utilizes a model based on one or more criteria to originate, or increase, online participation at a web portal. For example, the model may be based on the following criteria, which shall be discussed in more detail herein: Community, Hitchcock, Appointment, Progression, One-up, Status, and Smart ("CHAPOSS"). Accordingly, the CHAPOSS model may draw new users to a particular web portal and/or increase existing user involvement at the web portal.

The online participation configuration is provided to automatically generate a web portal based on a database model with specific rules. For example, the configuration is configured to obtain data from a user according to the specific rules so that the web portal is able to generate recommendations on a complete, or substantially complete, set of data.

Figure 1:
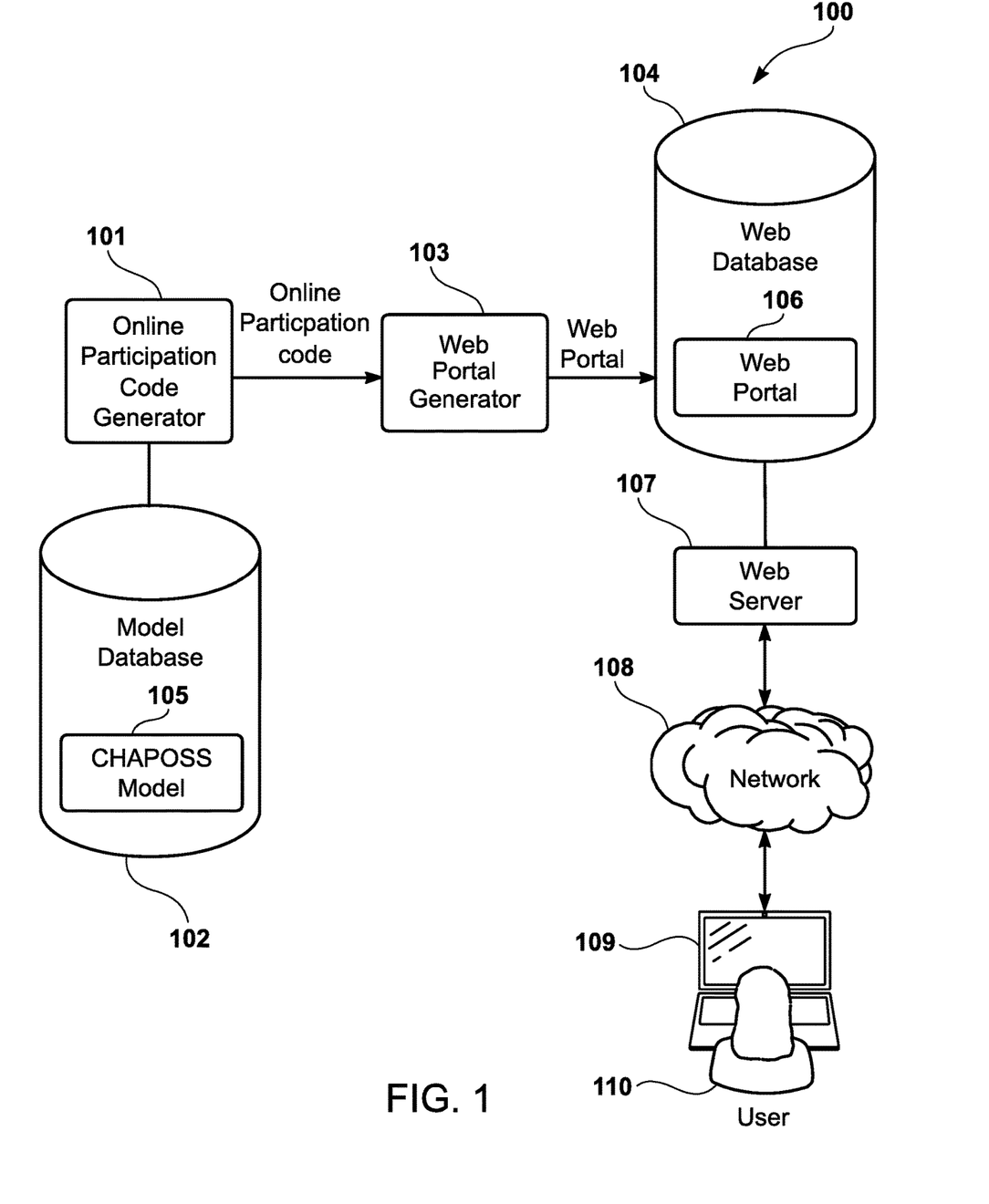
FIG. 1 illustrates an online participation system that automatically generates, or modifies, a web portal to improve online participation.

FIG. 1 illustrates an online participation system 100 that automatically generates, or modifies, a web portal to improve online participation. The online participation system 100 includes an online participation code generator 101 that automatically generates online participation code based on an online participation model (e.g., CHAPOSS model 105), which is stored in a model database 102.

As an example, the CHAPOSS model 105 provides seven rules for enhancing online participation at a web portal. Various incentives (e.g., points, rewards, etc.) may be provided to the user for submitting data to the web portal to comply with the CHAPOSS rules. The first rule is a Community criterion that necessitates that a web portal includes a community dynamic. In other words, the web portal has to include a feature (e.g., a family record) that is pertinent to a user distinct from the end-user accessing the web portal. The end-user may be provided with an incentive to satisfy the community criterion. For example, the end-user may be provided with points for adding a family document, adding a shared experience with another user, adding education involving another user, providing commentary about a user experience of a different user, etc.

Further, the second rule is a Hitchcock criterion that necessitates that the web portal provides guidance to the end-user via the web portal. For instance, the web portal may satisfy the Hitchcock criterion via various graphical indicia that provide guidance, or clues about how to obtain guidance, for increasing the rate of document completion. Alternatively, the guidance may be based on one or more financial recommendations automatically generated based on the documents that have been uploaded to the web portal. Accordingly, the user obtains an awareness of how much data has been included within the web portal. Various incentives may be provided to the user to submit additional data to the web portal. For instance, the Hitchcock criterion may necessitate a particular data threshold status requirement (e.g., sixty percent); the user may then be provided with an incentive for meeting that data status requirement.

In addition, the third rule is an Appointment criterion. The Appointment criterion necessitates that the web portal provides an alert mechanism (e.g., push notification) to the user with respect to incomplete, or soon-to-be expired, data or documents. The user may be provided with an incentive for enabling such alert mechanism.

Moreover, the fourth rule is a Progression criterion. The Progression criterion necessitates that the web portal provides a visual indicator (e.g., time-based slider) that visually illustrates the progress of a user with respect to document completion. For example, the visual indicator may be a slider that is demarcated according to five year increments of age. Various visual indicia may illustrate to the user what documents should be completed at particular ages along the slider. In one embodiment, the user obtains an incentive for interacting with the slider (e.g., moving the slider to different ages to determine at what age different documents should be completed).

Further, the fifth rule is a One-up criterion. The One-up criterion necessitates that the web portal provides competition between the user and one or more distinct users. For example, the web portal may visually indicate, via one or more graphical indicia, the document completion rate of the user in comparison with one or more distinct users. The user may then obtain incentives for meeting a threshold document completion requirement with respect to the distinct one or more users.

Moreover, the sixth rule is a Status criterion. The Status criterion necessitates that the web portal provides one or more images indicative of a status associated with the document completion percentage of the user. For example, various avatars, stars, etc. may be used to connote a particular status based on the document completion percentage.

Finally, the seventh rule is a Smart criterion. The Smart criterion necessitates that the web portal provide one or more visual benchmark indicia with respect to one or more documents that have been completed by the user. For example, the web portal may display a visual indicium congratulating the user on completing a document ahead of schedule (i.e., at an age prior to what would normally be deemed to be the age for completion of that document).

After generating online participation code based on the CHAPOSS model 105, the online participation code generator 101 sends the online participation code to the web portal generator 103. Accordingly, the web portal generator 103 generates a web portal based on the online participation code; as a result, the web portal is generated to comply with the CHAPOSS model 105. Alternatively, the web portal generator 103 modifies a web portal based on the online participation code. Further, the web portal generator 103 stores the web portal 106 in a web database 104 for access by a web server 107. A user 110 may then utilize a computing device 109 (e.g., laptop computer, personal computer, tablet device, smartphone, smart wearable, smart glasses, kiosk, etc.) to access the web portal 106 via the web server 107 through a network 108 (wired or wireless).

The CHAPOSS model 105 is just an example of a model from the model database 102 that may be utilized by the online participation code generator 101 to generate code for rules that have to be implemented by the web portal generator 103 when generating a new, or modifying a previous, web portal. Accordingly, rules from the CHAPOSS model 105 may be utilized without other rules. Further, additional rules may be utilized in conjunction with the CHAPOSS model 105. Alternatively, a different model, with different rules than the CHAPOSS model 105, may be utilized by the online participation code generator 101 to improve participation at a web portal corresponding to a Fintech platform.

Further, the execution of the rules (e.g., CHAPOSS or other rules) does not have to be sequential. The rules may be optional.

In one embodiment, the online participation code generator 101 and the web portal generator 103 are distinct from one another. In an alternative embodiment, the web portal generator 103 generates the web portal 106 based upon the model selected from the model database 102. In other words, the web portal generator 103 may communicate directly with the model database 102 and automatically generate the web portal 106 based on the selected model.

Figure 2A:
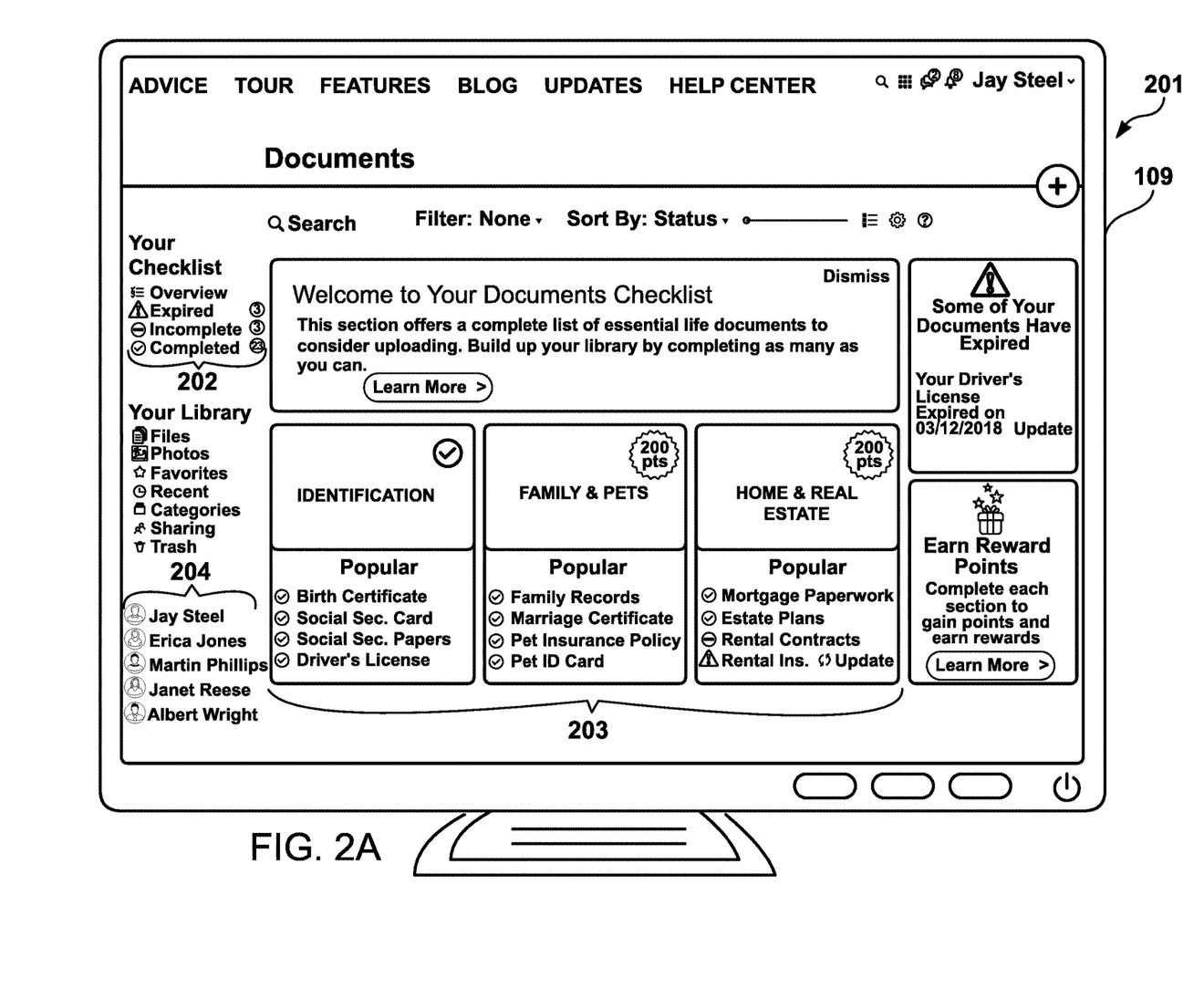
FIG. 2A illustrates an example of a screenshot of the web portal, which is rendered by the computing device illustrated in FIG. 1, that illustrates the Community criterion.

FIGS. 2A-2K illustrate example screenshots of screens of the web portal 106, which are based on the CHAPOSS model 105, illustrated in FIG. 1. For example, FIG. 2A illustrates an example of a screenshot 201 of the web portal 106, which is rendered by the computing device 109 illustrated in FIG. 1, that illustrates the Community criterion of the CHAPOSS model 105. The web portal 106 illustrates a document checklist for a Fintech platform. As an example, the web portal 106 illustrates a plurality of categories 202: expired, incomplete, and completed. In addition, the web portal 107 may categorize the documents according to a second set of categories 203: identification, community, and real estate. Accordingly, the user may be provided with different ways of categorizing the documents. Further, a list 204 of community members (e.g., family, friends, etc.) may be rendered within the screenshot 201.

By providing different ways for the user to include other users within the web portal user experience, the web portal 106 displayed in the screenshot 201 complies with the first rule, the Community criterion, of the CHAPOSS model 105.

Figure 2B:
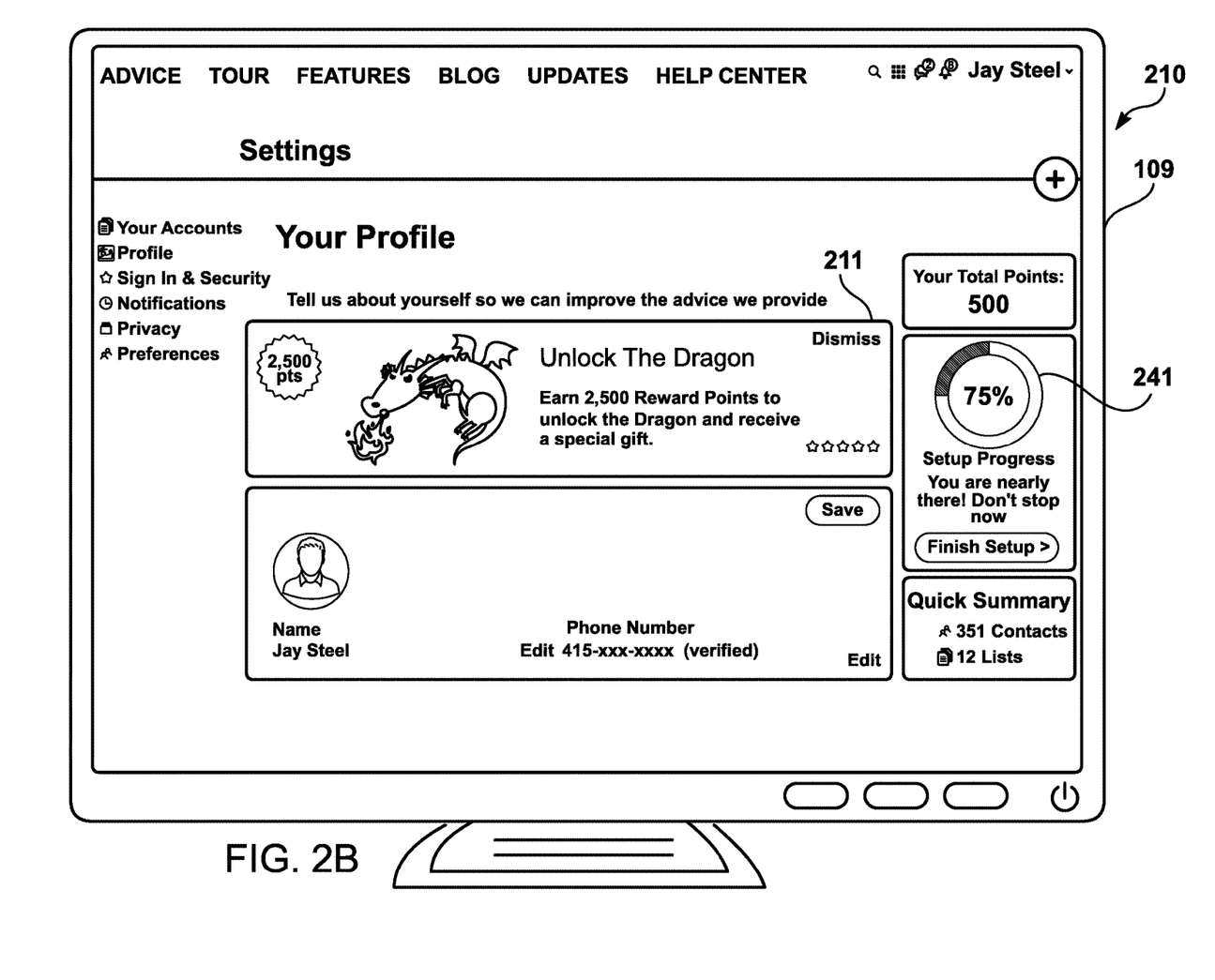
FIG. 2B illustrates an example of a screenshot of the web portal, which is rendered by the computing device illustrated in FIG. 1, that illustrates the Hitchcock criterion.

Further, FIG. 2B illustrates an example of a screenshot 210 of the web portal 106, which is rendered by the computing device 109 illustrated in FIG. 1, that illustrates the Hitchcock criterion of the CHAPOSS model 105. The web portal 106 illustrates a guidance indicium 211 that may be selected by the user to obtain guidance (e.g., financial recommendations). The user may be provided with an incentive (e.g., points, rewards, etc.) for completing a user profile, questionnaire, etc. that may help automatically generate the guidance for the user.

Figure 2C:
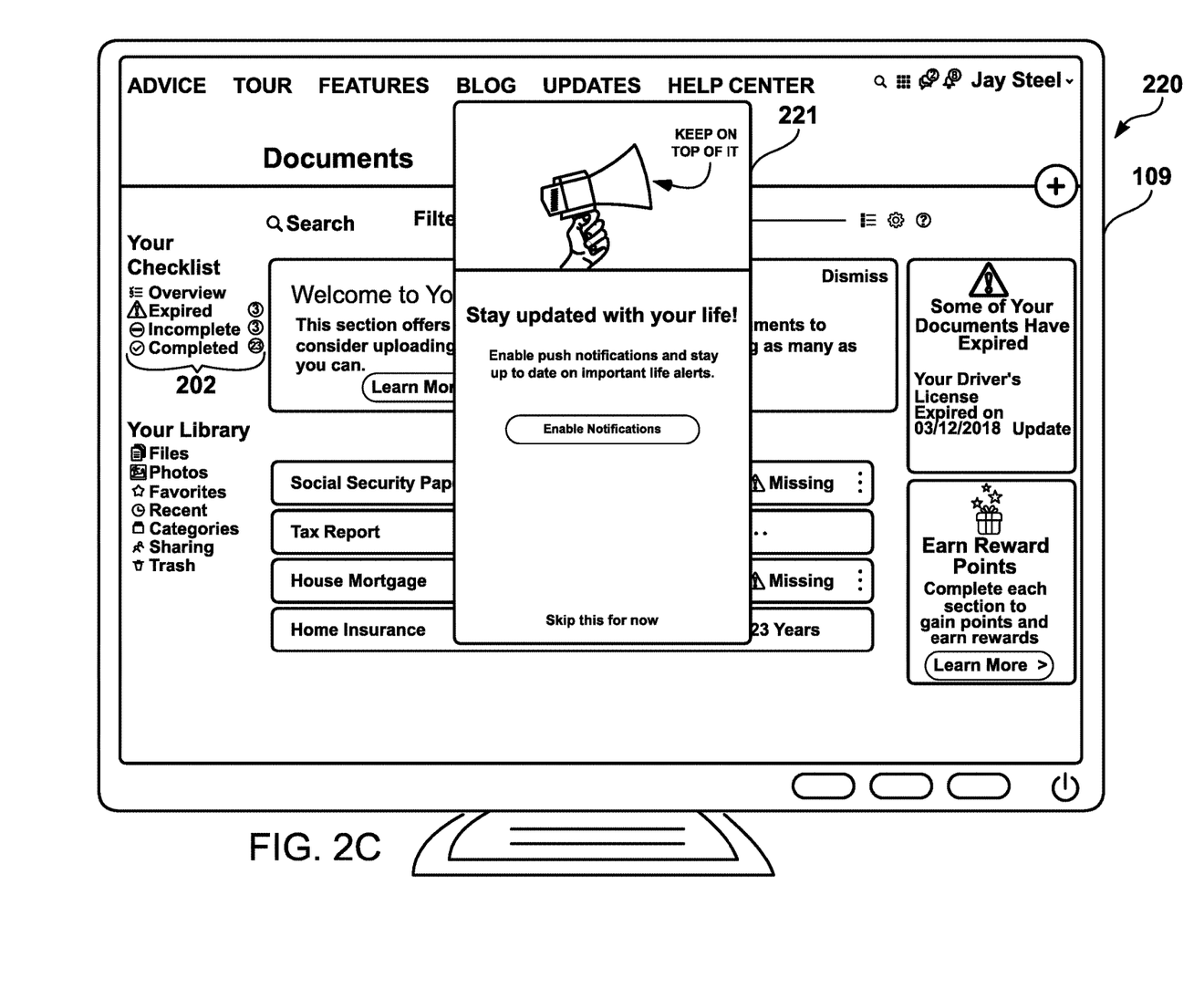
FIG. 2C illustrates an example of a screenshot of the web portal, which is rendered by the computing device illustrated in FIG. 1, that illustrates the Appointment criterion.

In addition, FIG. 2C illustrates an example of a screenshot 220 of the web portal 106, which is rendered by the computing device 109 illustrated in FIG. 1, that illustrates the Appointment criterion of the CHAPOSS model 105. The web portal 106 illustrates a push notification enablement menu 221. Accordingly, the user is able to enable push notifications to alert the user with respect to the expiration, or other updating requirement, for a particular document. The user may be provided with an incentive (e.g., points, rewards, etc.) for enabling push notifications, or other alert mechanisms.

Moreover, FIG. 2D illustrates an example of a screenshot 230 of the web portal 106, which is rendered by the computing device 109 illustrated in FIG. 1, that illustrates the Progression criterion of the CHAPOSS model 105. The web portal 106 illustrates a visual slider 231 with various time-based demarcations based on age. A user is able to slide, via the computing device 109, an object (e.g., arrow, circle, etc.) along the visual slider 231 to view various documents that should be completed at various ages. Accordingly, the screenshot 230 illustrates the web portal 106 complying with the Progression criterion of the CHAPOSS model 105.

Figure 2E:
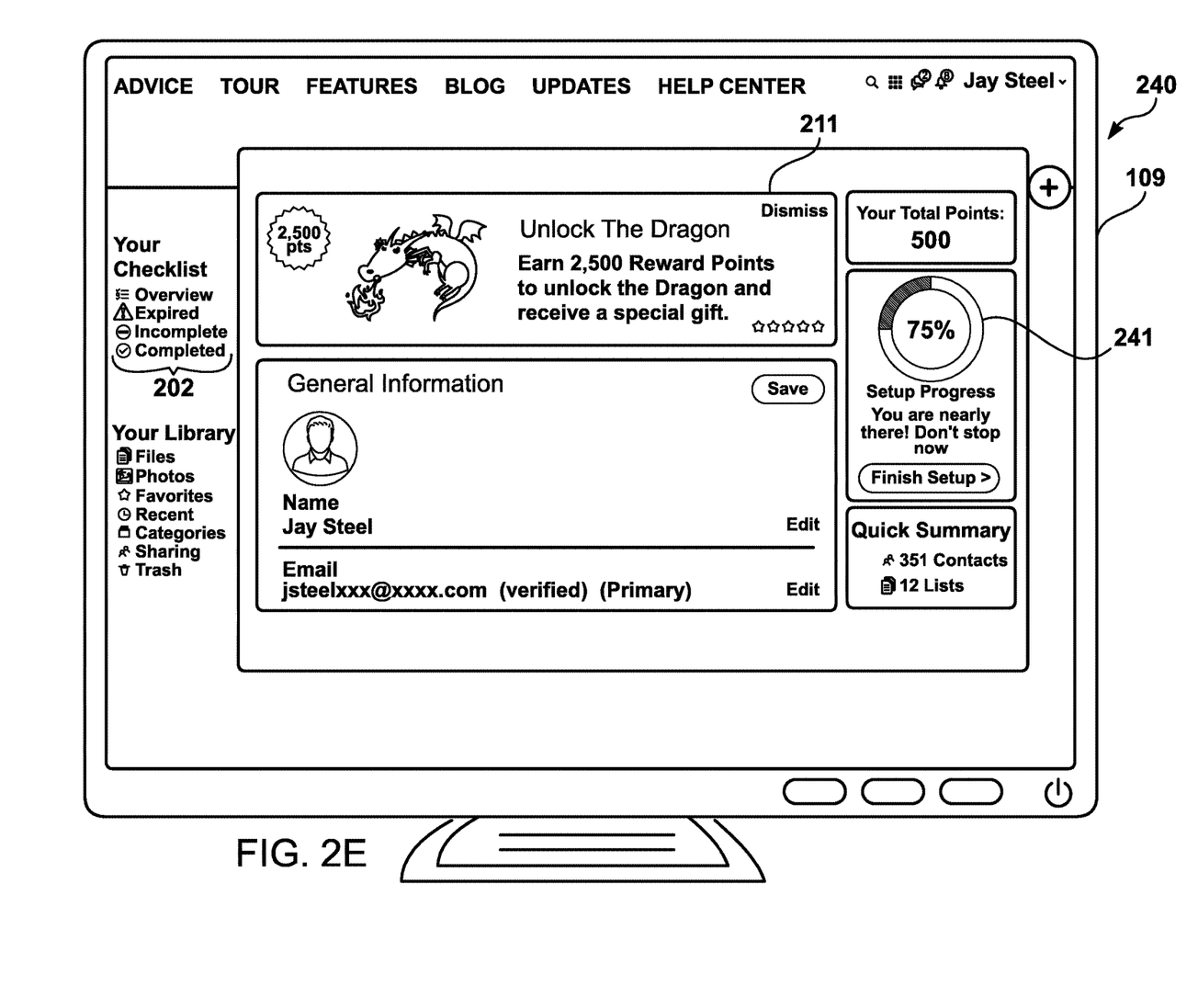
FIG. 2E illustrates an example of a screenshot of the web portal, which is rendered by the computing device illustrated in FIG. 1, that illustrates the One-Up criterion.

Further, FIG. 2E illustrates an example of a screenshot 240 of the web portal 106, which is rendered by the computing device 109 illustrated in FIG. 1, that illustrates the One-Up criterion of the CHAPOSS model 105. The web portal 106 illustrates a percentage indicium 241 that indicates the percentage of documents that have been completed.

Figure 2F:
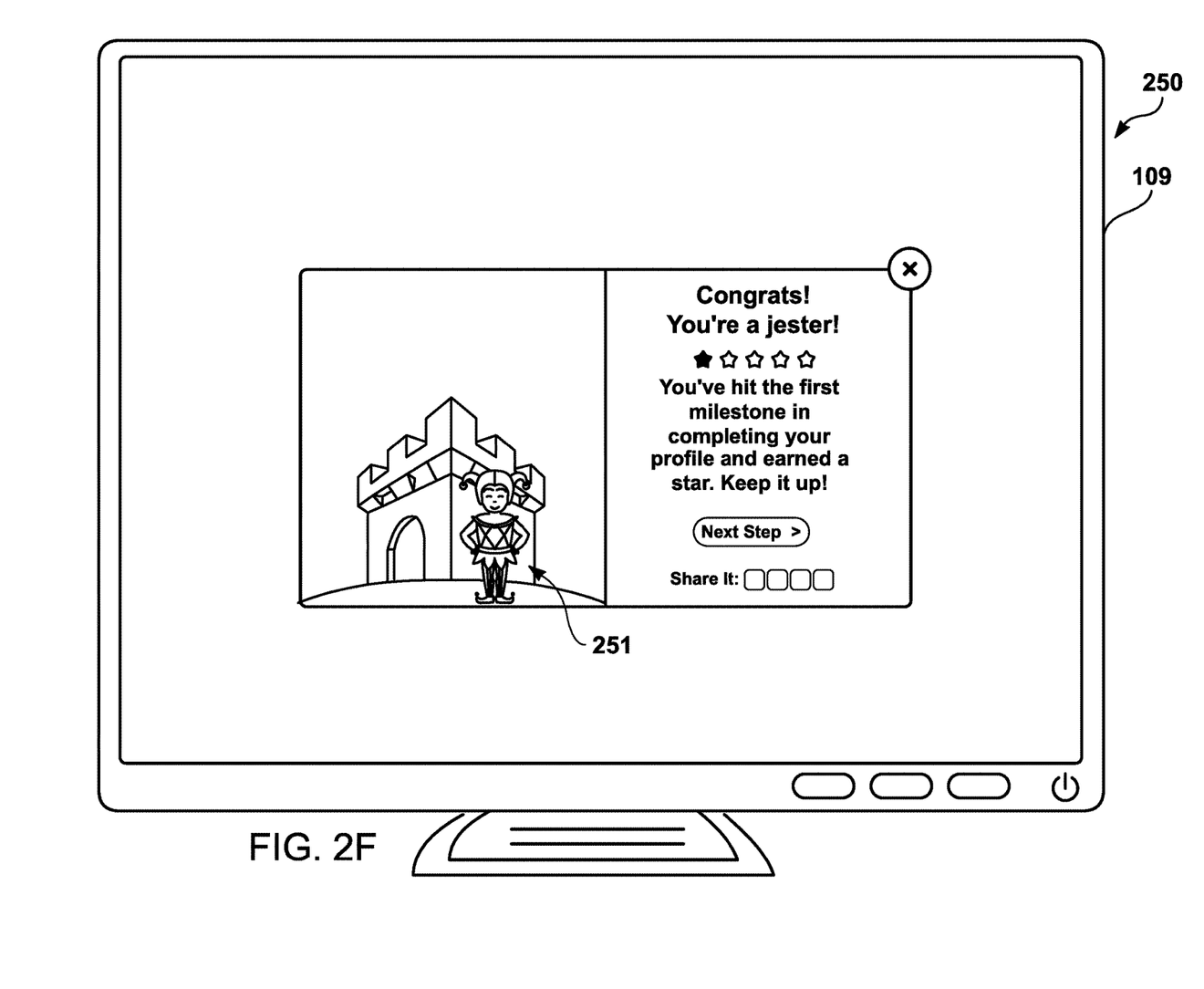
FIG. 2F illustrates a screenshot of an avatar corresponding to a jester to indicate that the user is just at the initial stages of document completion.
Figure 2G:
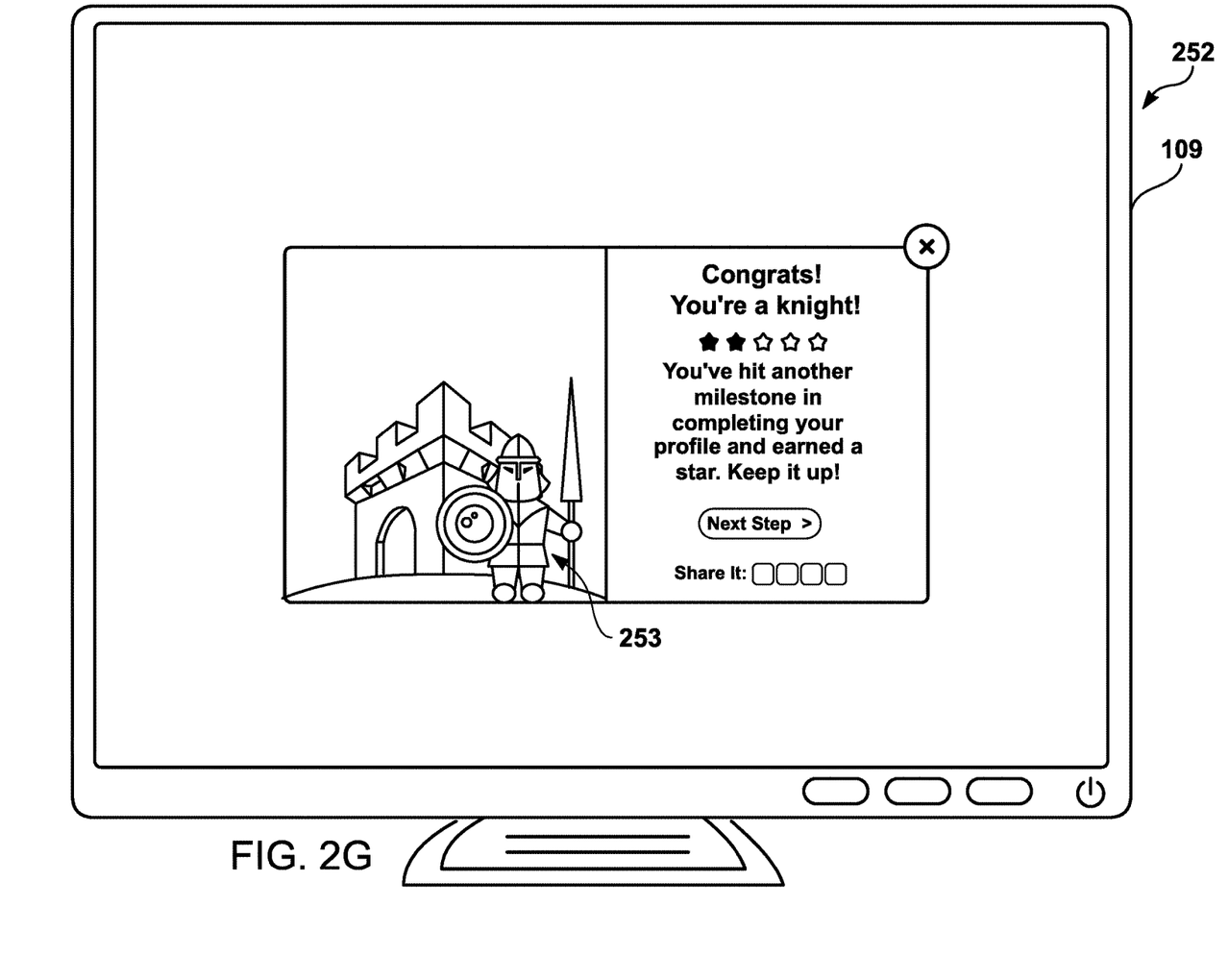
FIG. 2G illustrates a screenshot of an avatar corresponding to a knight to indicate that the user is further along in document completion.
Figure 2H:
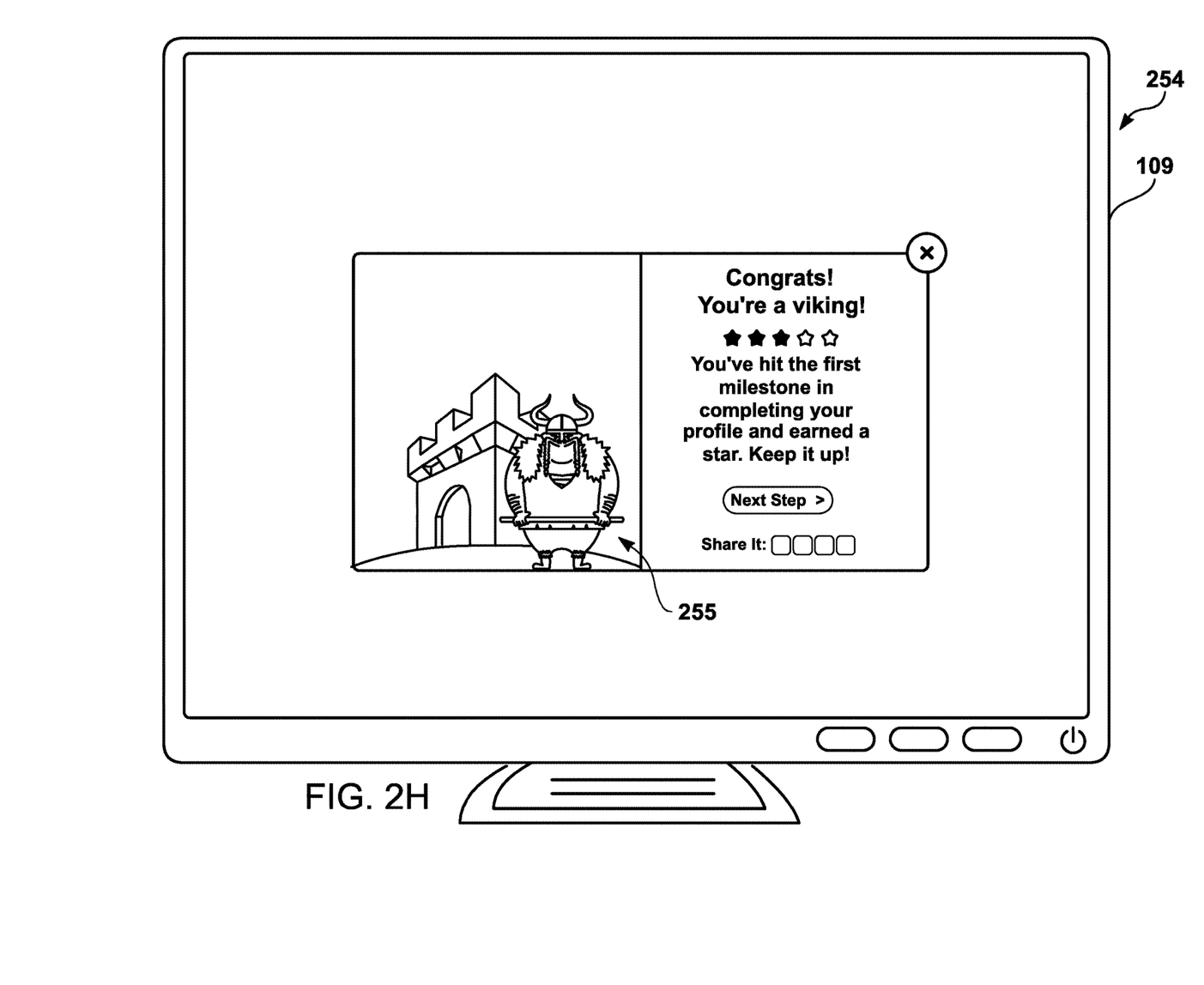
FIG. 2H illustrates a screenshot of an avatar corresponding to a Viking to indicate that the user is even further along in document completion.
Figure 2I:
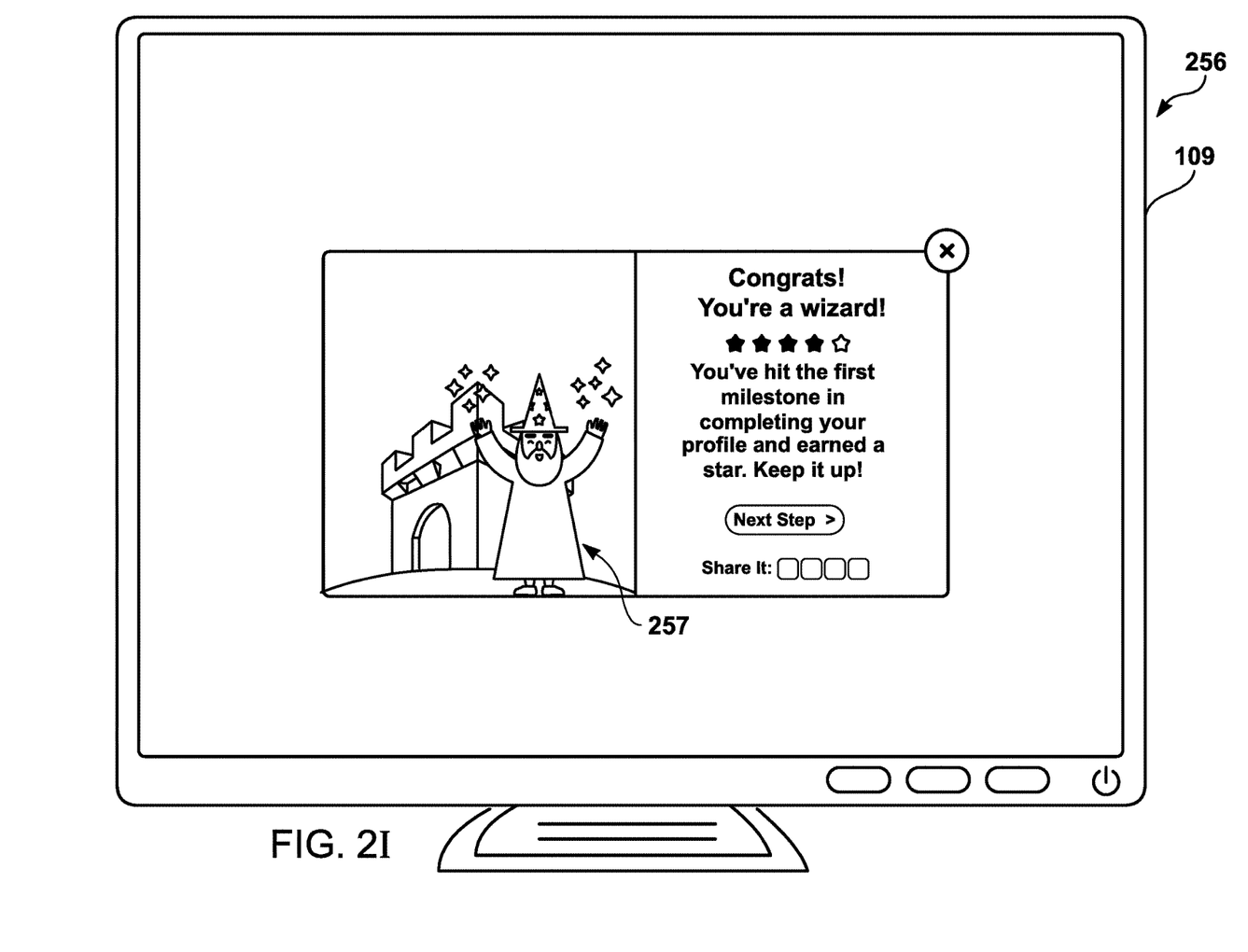
FIG. 2I illustrates a screenshot of an avatar corresponding to a wizard to indicate that the user is approaching the final stages of document completion.
Figure 2J:
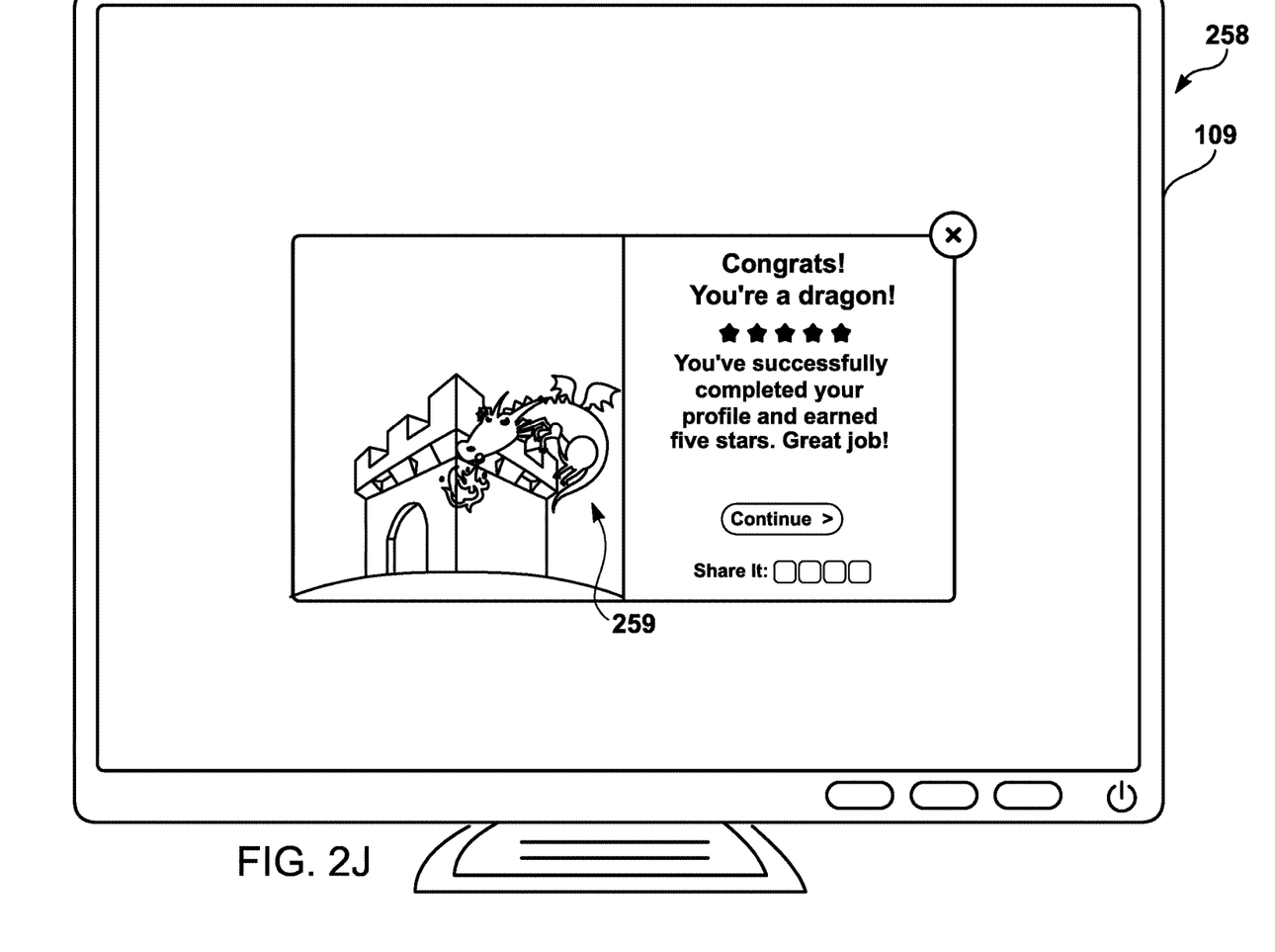
FIG. 2J illustrates a screenshot of an avatar corresponding to a dragon to indicate that the user has reached the final stages of document completion.

Moreover, FIGS. 2F-2J illustrate various screenshots 250, 252, 254, 256, and 258 of the web portal 106, which is rendered by the computing device 109 illustrated in FIG. 1, that illustrates the Status criterion of the CHAPOSS model 105. For example, FIG. 2F illustrates a screenshot 250 of an avatar 251 corresponding to a jester to indicate that the user is just at the initial stages of document completion. (A star-based system may be used as an alternative, or in addition, to images.) Further, FIG. 2G illustrates a screenshot 252 of an avatar 253 corresponding to a knight to indicate that the user is further along in document completion. In addition, FIG. 2H illustrates a screenshot 254 of an avatar 255 corresponding to a Viking to indicate that the user is even further along in document completion. Moreover, FIG. 2I illustrates a screenshot 256 of an avatar 257 corresponding to a wizard to indicate that the user is approaching the final stages of document completion. Finally, FIG. 2J illustrates a screenshot 258 of an avatar 259 corresponding to a dragon to indicate that the user has reached the final stages of document completion.

Finally, FIG. 2K illustrates an example of a screenshot 260 of the web portal 106, which is rendered by the computing device 109 illustrated in FIG. 1, that illustrates the Smart criterion of the CHAPOSS model 105. The web portal 106 illustrates a smart indicium 261 that indicates one or more ways in which the user has completed a document of what would be deemed to be ahead of schedule.

Figure 3:
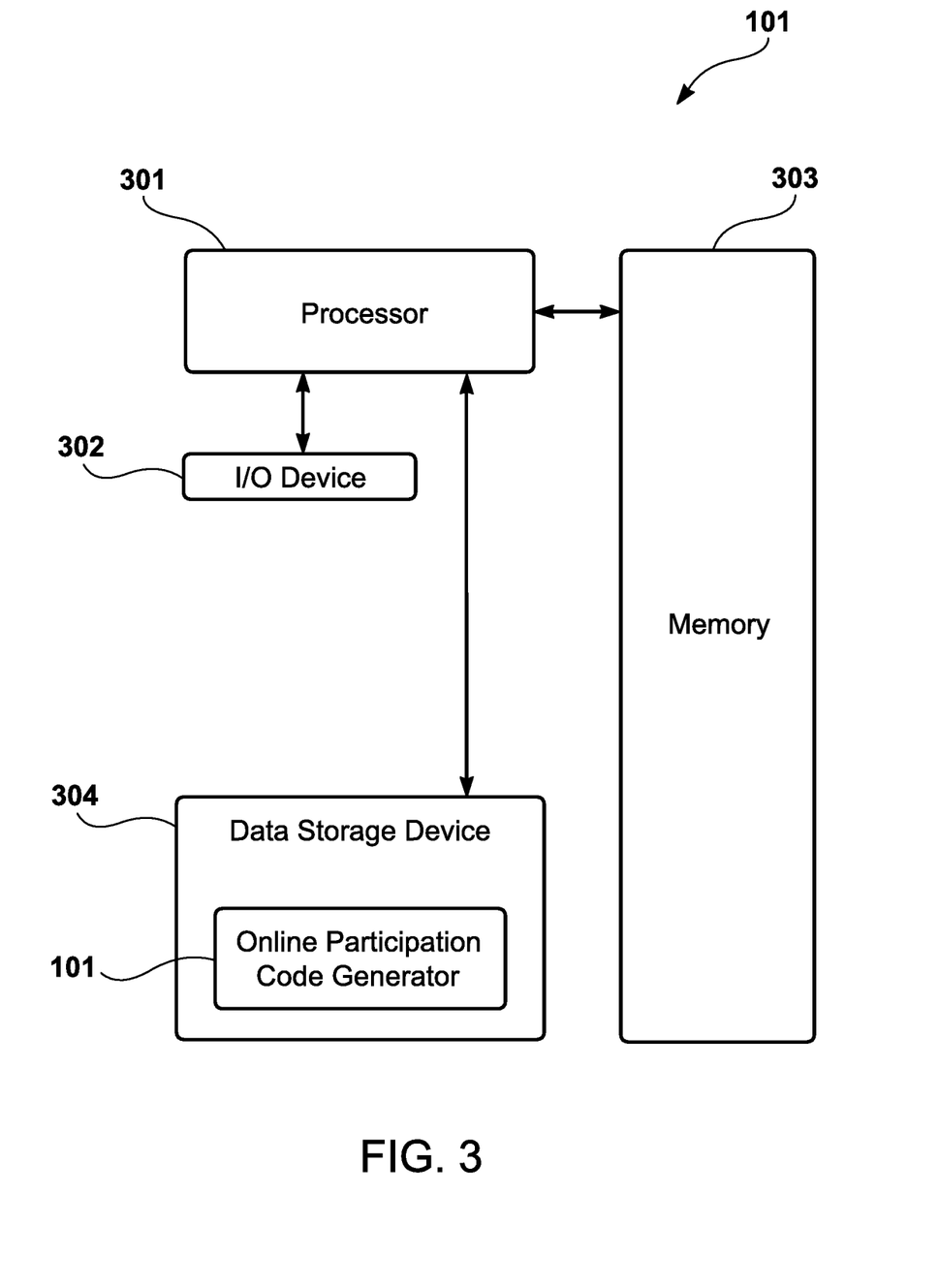
FIG. 3 illustrates the internal components of the online participation system illustrated in FIG. 1.

FIG. 3 illustrates the internal components of the online participation system 100 illustrated in FIG. 1. In one embodiment, the online participation system 100 is implemented utilizing a specialized computer or any other hardware equivalents. The online participation system 100 has a processor 301, a memory 303 (e.g., random access memory and/or read only memory), online participation code generator 101, a data storage device 304 that stores the online participation code generator 101, and various input/output ("I/O") devices 302 (e.g., audio/video outputs, audio/video inputs, a receiver, a transmitter, a speaker, a display, an image capturing sensor, a clock, an output port, a user input device, etc.).

The online participation system 100 improves the technological process of web portal generation for a Fintech platform. The rules of the online participation model 105 ensure that the web portal 106 is built in a manner that improves online participation of users uploading documents to the web portal, thereby leading to lesser memory requirements and increased computational efficiency for automatically generating the web portal. Rather than merely using a computer as a tool to automate conventional activity (e.g., automating a financial recommendation), the online participation system 100 incorporates specific rules from the online participation model 105 to improve the technological process of generating a web portal. Accordingly, memory requirements and computational inefficiencies may be reduced through the technological process of generating an improved web portal.

Figure 4:
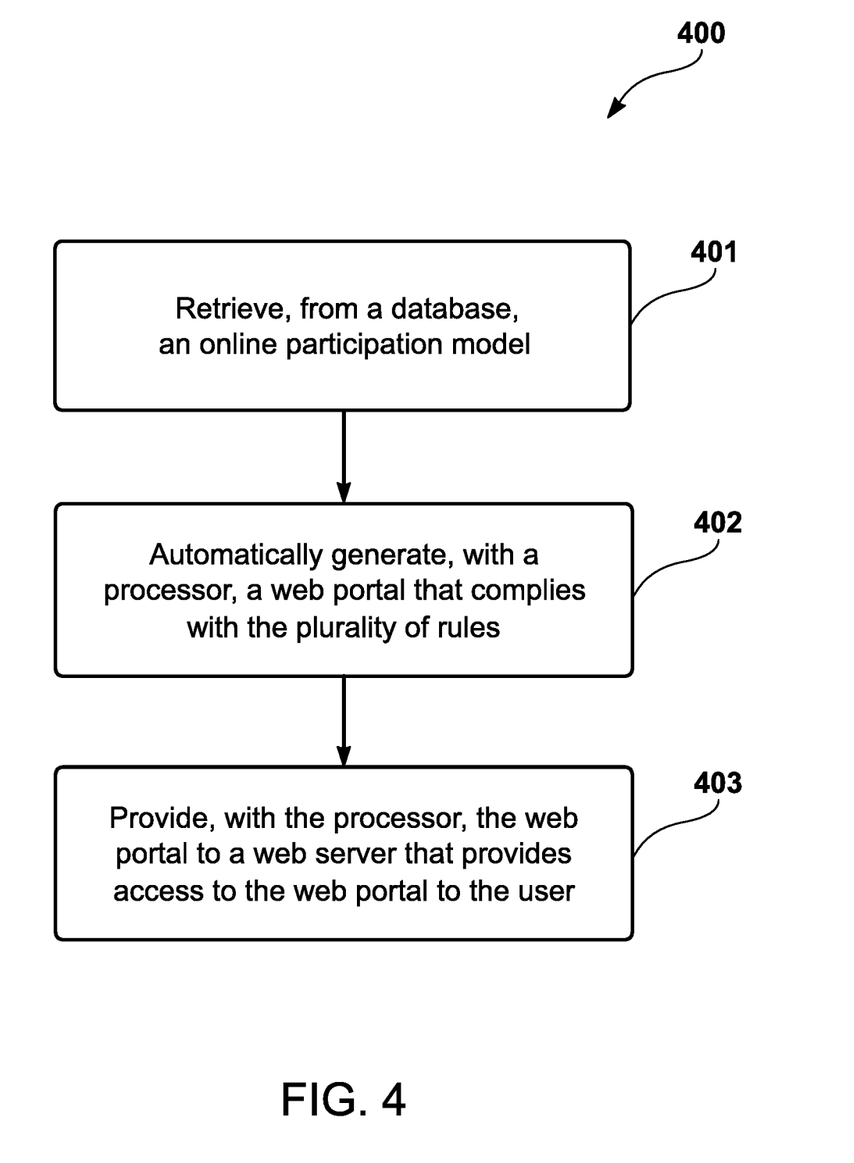
FIG. 4 illustrates a process that may be utilized by the online participation system illustrated in FIG. 1 to generate online participation for the web portal.

FIG. 4 illustrates a process 400 that may be utilized by the online participation system 100 illustrated in FIG. 1 to generate online participation for the web portal 106. At a process block 401, the process 400 retrieves, from the model database 102 (FIG. 1), an online participation model. The online participation model includes a plurality of rules for generating a web portal that aggregates a plurality of documents corresponding to a user. The plurality of rules includes a Community criterion for displaying information associated with an additional user distinct from the user at the web portal 106. Further, the plurality of rules includes an Appointment criterion that enables a user notification for document completion. In addition, the plurality of rules includes a Progression criterion that displays a visual slider 231 (FIG. 2D) corresponding to document completion according to a plurality of time-based demarcations. Moreover, the plurality of rules further includes a Status criterion that displays a plurality of visual indicia corresponding to a status of the user based on document completion.

Additionally, at a process block 402, the process 400 automatically generates, with the processor 301 (FIG. 3), a web portal 106 that complies with the plurality of rules. Finally, at a process block 403, the process 400 provides, with the processor 301, the web portal 106 to the web server 107, which then provides access to the web portal 106 to the user 110.

Although the processes described herein have been exemplified via a web portal, the process may be implemented via other types of software applications. For example, an application executed by a mobile computing device (e.g., smartphone, tablet device, smartwatch, smart wearable, etc.) may implement the aforementioned processes.

It is understood that the processes, systems, apparatuses, and computer program products described herein may also be applied in other types of processes, systems, apparatuses, and computer program products. Those skilled in the art will appreciate that the various adaptations and modifications of the embodiments of the processes, systems, apparatuses, and computer program products described herein may be configured without departing from the scope and spirit of the present processes and systems. Therefore, it is to be understood that, within the scope of the appended claims, the present processes, systems, apparatuses, and computer program products may be practiced other than as specifically described herein.

We claim:

1. A computer program product comprising a non-transitory computer useable storage device having a computer readable program, wherein the computer readable program when executed on a computer causes the computer to:
retrieve, from a database, an online participation model, the online participation model comprising a plurality of rules for generating a web portal that aggregates a plurality of documents corresponding to a user, the plurality of rules comprising a community criterion for adding data associated with an additional user distinct from the user at the web portal, the plurality of rules further comprising an appointment criterion that enables a user notification for document completion, the plurality of rules further comprising a progression criterion that displays a visual slider corresponding to document completion of each of the plurality of documents based on one of a plurality of user age demarcations indicating an age-based completion benchmark, the plurality of rules further comprising a status criterion that displays a plurality of visual indicia corresponding to a status of the user based on document completion, wherein the plurality of rules further comprises a benchmark criterion that assesses uploading of a document based on one of the plurality of user age demarcations, wherein the plurality of rules further comprises an avatar criterion for generating one of a plurality of distinct avatars based on a document upload rate, wherein the data associated with the additional user is selected from the group consisting of: a family document, a shared experience between the user and the additional user, and commentary by the user about the additional user;
automatically generate, with a processor, a web portal that complies with the plurality of rules;
automatically generate, with the processor, a point-based incentive for compliance with the community criterion; and
provide, with the processor, the web portal to a web server that provides access to the web portal to the user.

2. The computer program product of claim 1, wherein the plurality of rules further comprises a guidance criterion that displays a recommendation based on the plurality of documents.

3. The computer program product of claim 1, wherein the plurality of rules further comprises a competition criterion that assesses a quantity of documents uploaded by a user in comparison with one or more distinct users.

4. The computer program product of claim 1, wherein the user notification is a notification.

5. The computer program product of claim 1, wherein the plurality of rules further comprises an incentive criterion that is generated to provide one or more incentives to a user based on a document upload rate.

6. The computer program product of claim 1, further comprising a slidable visual indicium that is movable with respect to the visual slider.

7. The computer program product of claim 6, wherein a document indicium is displayed in proximity to the visual slider based on a position of the visual indicium with respect to one of the plurality of user age demarcations, the document indicium indicating document completion for a particular document.

8. A system comprising:
a database that stores an online participation model, the online participation model comprising a plurality of rules for generating a web portal that aggregates a plurality of documents corresponding to a user, the plurality of rules comprising a community criterion for adding data associated with an additional user distinct from the user at the web portal, the plurality of rules further comprising an appointment criterion that enables a user notification for document completion, the plurality of rules further comprising a progression criterion that displays a visual slider corresponding to document completion of each of the plurality of documents based on one of a plurality of user age demarcations indicating an age-based completion benchmark, the plurality of rules further comprising a status criterion that displays a plurality of visual indicia corresponding to a status of the user based on document completion, wherein the plurality of rules further comprises a benchmark criterion that assesses uploading of a document based on one of the plurality of user age demarcations, wherein the plurality of rules further comprises an avatar criterion for generating one of a plurality of distinct avatars based on a document upload rate, wherein the data associated with the additional user is selected from the group consisting of: a family document, a shared experience between the user and the additional user, and commentary by the user about the additional user; and
a processor that retrieves the online participation model from the database, automatically generates a web portal that complies with the plurality of rules, automatically generates a point-based incentive for compliance with the community criterion, and provides the web portal to a web server that provides access to the web portal to the user.

9. The system of claim 8, wherein the plurality of rules further comprises a guidance criterion that displays a recommendation based on the plurality of documents.

10. The system of claim 8, wherein the plurality of rules further comprises a competition criterion that assesses a quantity of documents uploaded by a user in comparison with one or more distinct users.

11. The system of claim 8, wherein the user notification is a notification.

12. The system of claim 8, wherein the plurality of rules further comprises an incentive criterion that is generated to provide one or more incentives to a user based on a document upload rate.

13. The system of claim 8, further comprising a slidable visual indicium that is movable with respect to the visual slider.

14. The system of claim 8, wherein a document indicium is displayed in proximity to the visual slider based on a position of the visual indicium with respect to one of the plurality of user age demarcations, the document indicium indicating document completion for a particular document.

\* \* \* \* \*